(12) United States Patent
Ogorodnikov et al.

(10) Patent No.: US 12,437,362 B2
(45) Date of Patent: Oct. 7, 2025

(54) SYSTEMS AND METHODS FOR VEHICLE-BASED IMAGING

(71) Applicant: Ford Global Technologies, LLC, Dearborn, MI (US)

(72) Inventors: Dmitry Ogorodnikov, Amherstburg (CA); Omar Iftikhar, Dearborn, MI (US); Ricardo Walker, Southfield, MI (US); Steven Anthony Chapekis, Escanaba, MI (US)

( * ) Notice: Subject to any disclaimer, the term of this patent is extended or adjusted under 35 U.S.C. 154(b) by 712 days.

(21) Appl. No.: 17/659,856

(22) Filed: Apr. 20, 2022

(65) Prior Publication Data

US 2023/0342880 A1    Oct. 26, 2023

(51) Int. Cl.
*G06T 3/40*    (2024.01)
*B60R 1/22*    (2022.01)
(Continued)

(52) U.S. Cl.
CPC .............. *G06T 3/4038* (2013.01); *B60R 1/22* (2022.01); *B60R 1/29* (2022.01); *B60R 11/04* (2013.01); *G06T 7/70* (2017.01); *G06T 11/60* (2013.01); *G06T 13/40* (2013.01); *G06V 20/58* (2022.01); *G06V 20/593* (2022.01); *G06V 40/10* (2022.01);
(Continued)

(58) Field of Classification Search
None
See application file for complete search history.

(56) References Cited

U.S. PATENT DOCUMENTS

2010/0158380 A1*  6/2010  Neville .............. H04N 1/00188
                                                     382/190
2016/0381323 A1   12/2016  Garcia, III et al.
(Continued)

FOREIGN PATENT DOCUMENTS

KR         20210027037 A      3/2021

OTHER PUBLICATIONS

A. Hanel et al., Structure-from-Motion for Calibration of a Vehicle Camera System with Non-Overlapping Fields-of-View in an Urban Evironment, The International Archives of the Photogrammetry, Remote Sensing and Spatial Information Sciences, vol. XLII-1/W1, 2017 ISPRS Hannover Workshop: HRIGI 17—CMRT 17—ISA 17—EuroCOW 17, Jun. 6-9, 2017, 181-188.
(Continued)

*Primary Examiner* — Andrew H Lam
(74) *Attorney, Agent, or Firm* — Joseph Zane; Eversheds Sutherland (US) LLC (57) ABSTRACT

The disclosure is generally directed to systems and methods associated with generating images. An example method executed by a processor may include receiving, from a first vehicle, a first image based on a first field of view of objects located in a cabin area of the first vehicle and a second image based on a second field of view of objects located outside the first vehicle. The method may further include receiving, from a second vehicle, a third image based on a third field of view of objects located outside the second vehicle. A composite image may be generated based on the first image, the second image, and the third image. In one case, the composite image may be generated by superimposing at least a portion of the first image upon at least a portion of the second image and/or upon at least a portion of the third image.

20 Claims, 6 Drawing Sheets

(51) Int. Cl.
  *B60R 1/29* (2022.01)
  *B60R 11/04* (2006.01)
  *G06T 3/4038* (2024.01)
  *G06T 7/70* (2017.01)
  *G06T 11/60* (2006.01)
  *G06T 13/40* (2011.01)
  *G06V 20/58* (2022.01)
  *G06V 20/59* (2022.01)
  *G06V 40/10* (2022.01)
(52) U.S. Cl.
  CPC ... *B60R 2300/102* (2013.01); *B60R 2300/105* (2013.01); *B60R 2300/303* (2013.01); *B60R 2300/8006* (2013.01); *G06T 2207/30196* (2013.01); *G06T 2207/30252* (2013.01); *G06T 2207/30268* (2013.01)

(56) References Cited

U.S. PATENT DOCUMENTS

| | | | |
|---|---|---|---|
| 2019/0102924 A1* | 4/2019 | Albouze | H04N 1/387 |
| 2020/0186730 A1* | 6/2020 | Sakurada | H04N 23/90 |
| 2020/0342521 A1* | 10/2020 | Tang | G06Q 30/0643 |
| 2021/0142059 A1 | 5/2021 | Lee et al. | |
| 2021/0370773 A1* | 12/2021 | Oba | G06T 1/00 |

OTHER PUBLICATIONS

Ming-Der Yang et al., Image-Based 3D Scene Reconstruction and Exploration in Augmented Reality, Automation in Construction 33, Nov. 10, 2013, 48-60.

\* cited by examiner

SYSTEMS AND METHODS FOR VEHICLE-BASED IMAGING

BACKGROUND

Generating interesting images of one or more people seated inside a vehicle can be challenging due to constraints, such as cramped confines, and a lack of equipment available in the vehicle for generating such images.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, embodiments described in this disclosure are generally directed to systems and methods associated with generating images by use of an image generation system in a vehicle. An example method executed by a processor may include receiving, from a first vehicle, a first image and a second image. The first image is based on a first field of view of objects located in a cabin area of the first vehicle and the second image is based on a second field of view of objects located outside the first vehicle. The method may further include receiving, from a second vehicle, a third image based on a third field of view of objects located outside the second vehicle. A composite image may be then generated based on the first image, the second image, and the third image. In one example scenario, the objects located in the cabin area of the first vehicle may include a first individual. The objects located outside the first vehicle and/or outside the second vehicle may include a second individual. The composite image can include the first individual and the second individual. In another example scenario, the composite image may be generated by superimposing at least a portion of the first image upon at least a portion of the second image and/or upon at least a portion of the third image.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, it must be understood that the word "object" as used herein with respect to images encompasses various inanimate objects inside a vehicle (seat, dashboard, steering wheel, etc.), animate objects inside a vehicle (driver, passenger, pet, etc.), inanimate objects outside a vehicle (buildings, statues, structures, etc.), natural objects outside a vehicle (trees, mountains, waterfalls, rivers, animals, birds, etc.), and scenery outside a vehicle (sunset, sunrise, etc.). Words such as "image" and "photograph" may be used herein in an interchangeable manner. More particularly, the word "image" as used herein is a broad/generic label that encompasses any of various forms of images and photographs that can be captured by any of various types of image capture devices (still camera, digital camera, video camera, smartphone, etc.). The various forms of images and photographs can include still photographs, video clips, real-time video, movies, still frames etc.). A still frame is a single static image that may be obtained from a video clip or a video stream. A video clip is generally composed of a set of images that are captured sequentially over a period of time. A frame may be one image among a set of images that are a part of a video clip or a video stream. A video clip can include individual frames that are separated by frame lines (30 frames are typically used for 1 second video, 30 fps). Video frames can be compressed using various types of frame formats (i-frame, p-frame, and b-frame, for example) and various types of compression algorithms. Video frames can also be segmented into sliced sequences using techniques such as, for example, techniques defined by the H.264 video standard and/or H.265 video standard.

The word "vehicle" as used in this disclosure can pertain to any one of various types of vehicles such as, for example, cars, vans, sports utility vehicles, trucks, electric vehicles, gasoline vehicles, and hybrid vehicles. The described embodiments are applicable to various types of vehicles that are defined by the Society of Automotive Engineers (SAE) as incorporating six levels of driving automation ranging from Level 0 (fully manual) to Level 5 (fully autonomous). As such, in various instances, a description herein with reference to a driver of a vehicle should be understood as being equally applicable to a passenger in the vehicle (both in the case of a driver-operated vehicle and in the case of an autonomous vehicle where a "driver" may not be present).

It must also be understood that words such as "implementation," "application," "scenario," "case," and "situation" as used herein are an abbreviated version of the phrase "In an example ("implementation," "application," "scenario," "case," "approach," and "situation") in accordance with the disclosure." It must also be understood that the word "example" as used herein is intended to be non-exclusionary and non-limiting in nature.

Figure 1:
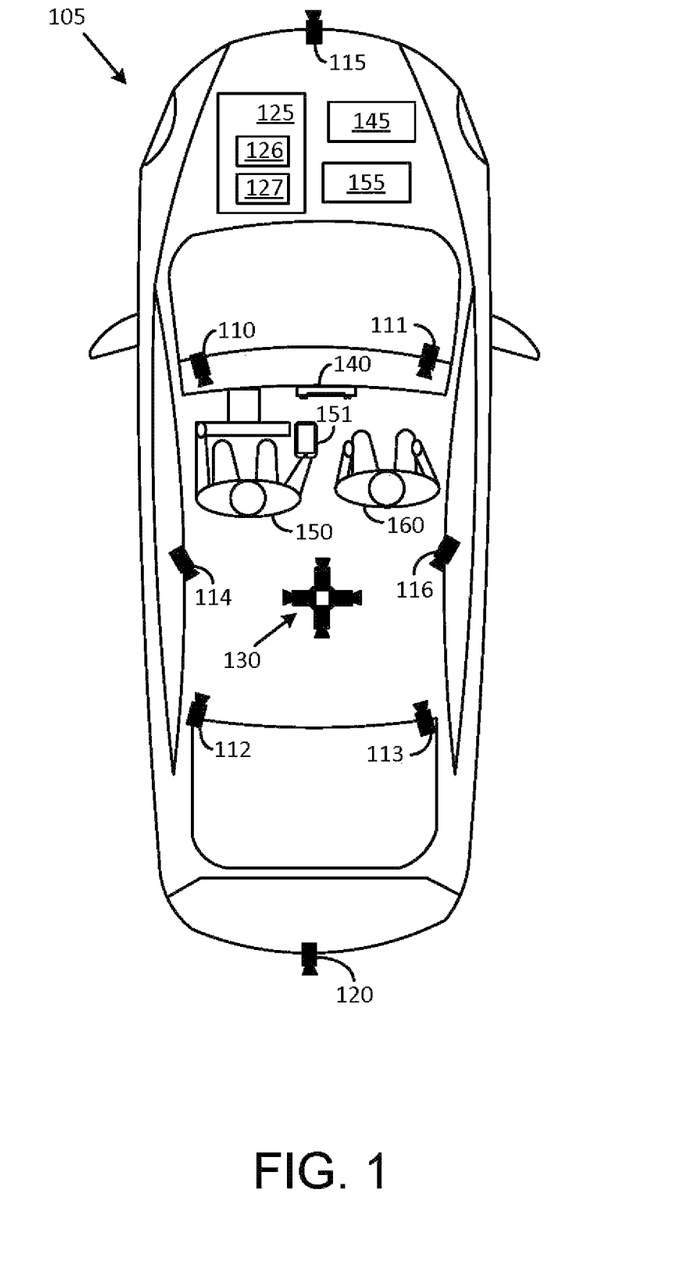
FIG. 1 shows an example vehicle that includes an image generation system in accordance with an embodiment of the disclosure.

FIG. 1 shows a vehicle 105 that includes an image generation system 125 in accordance with an embodiment of the disclosure. The image generation system 125 can include a processor 126 that is configured to execute computer-executable instructions stored in a memory 127 for performing various operations in accordance with the disclosure. Some example operations are described below.

The vehicle 105 may further include components such as, for example, a vehicle controller 145, a communications system 155, an infotainment system 140, and various image capture devices (such as, for example, a camera 110, a camera 111, a camera 112, a camera 113, a camera 114, a camera 115, a camera 116, a camera 120, and a camera 130). In some applications additional cameras may be provided at various other locations such as, for example, in a trunk area of the vehicle 105. These components may be communicatively coupled to each other, and to the image generation system 125, wirelessly and/or via wired connections.

The vehicle controller 145 may be operated to execute various operations related to the vehicle 105, such as, for example, controlling engine operations (fuel injection, speed control, emissions control, braking, etc.), managing climate controls (air conditioning, heating etc.), activating airbags, and issuing warnings (check engine light, bulb failure, low tire pressure, etc.), and also for executing various operations in accordance with disclosure.

In the illustrated scenario, the vehicle 105 is a driver-operated vehicle and the vehicle controller 145 responds to actions performed by a driver 150 (such as, for example, reducing the speed of the vehicle 105 when the driver 150 executes a braking operation, moving the vehicle 105 at a cruising speed when the driver 150 applies cruise control, and selecting an appropriate gear when the driver 150 steps on the accelerator).

In another example scenario, the vehicle 105 is an autonomous vehicle and the vehicle controller 145 performs some or all of various operations that may replicate those performed by a human driver. The vehicle controller 145 of the autonomous vehicle can be configured to perform various operations associated with providing imaging assistance in accordance with the disclosure. Providing imaging assistance can include, for example, autonomously configuring a camera to capture an image and capturing the image (either autonomously or by following instructions provided by the driver 150).

The infotainment system 140 may include a combination of various entertainment items (such as a radio, streaming audio solutions, etc., and USB access ports for digital audio devices). The infotainment system 140 may also include other types of items, such as, for example, a navigation system and a graphical user interface (GUI) that is displayed on a display screen. The driver 150 may use the GUI for interacting with the image generation system 125 for capturing various images such as, for example, a photograph of individuals and objects located outside the vehicle 105.

The cameras installed in the vehicle 105 can be any of various types of image capture devices such as, for example, a digital camera that captures a still image, a video camera that captures a video clip and/or a video camera that captures real-time video. Each of the cameras may be mounted at any of various locations on the vehicle 105. In the illustrated implementation, the camera 110 is mounted in an interior portion of the vehicle 105 (in a cabin area), and each of the other cameras (the camera 115, the camera 120, and the camera 130) is mounted on an exterior portion of the vehicle 105.

More particularly, in the illustrated example, the camera 130 is an image capture device that is mounted on the roof the vehicle 105 and provides a 360-degree field of view for capturing images of any object that is located anywhere around the outside of the vehicle 105. The images are conveyed to the image generation system 125 for executing various operations in accordance with the disclosure. When the vehicle 105 is an autonomous vehicle, the camera 130 may be further configured to convey images to the vehicle controller 145 so as to enable the vehicle controller 145 to autonomously control the movement of the vehicle 105 (navigation, collision avoidance, etc.).

The camera 115 may be mounted upon a front portion of the vehicle 105 (for example, on a front bumper, behind a grille, on a license plate etc.) and configured for capturing images of objects located in front of the vehicle 105. The camera 120 may be mounted upon a rear portion of the vehicle 105 (for example, on a rear bumper, on a trunk, on a license plate etc.) and configured for capturing images of objects located behind the vehicle 105. Images captured by the camera 115 and the camera 120 may be conveyed to the image generation system 125 in accordance with the disclosure. When the vehicle 105 is an autonomous vehicle, images captured by the camera 115 and the camera 120 may be conveyed to the vehicle controller 145 to enable the vehicle controller 145 to autonomously control the movement of the vehicle 105 (navigation, collision avoidance, etc.).

In some implementations, images captured by the various cameras may also be conveyed in accordance with the disclosure, to the infotainment system 140 and/or to a personal device such as, for example a personal device 151 carried by the driver 150. The personal device 151 can be any of various devices such as, for example, a smartphone, a tablet computer, a laptop computer, or wearable smart device (a smartwatch, for example). In one case, a preview image may be evaluated by the driver 150 based on a display of the preview image on a display screen of the infotainment system 140 and/or of the personal device 151, prior to capturing an image. The evaluation may be carried out, for example, to compose a field of view of a camera.

An imaging operation in accordance with the disclosure can include operating the camera 110 to capture a first image based on a first field of view of objects located in a cabin area of the vehicle 105 and operating the camera 130 (and/or the camera 115 and camera 120) to capture a second image based on a second field of view of objects located outside the vehicle 105. The first field of view of objects located in the cabin area of the vehicle 105 can encompass the driver 150, a passenger 160, and various components of the vehicle 105 (steering wheel, dashboard, driver seat, passenger seat, rear windshield, etc.). In some cases, cameras other than the camera 110 may be used to capture the first image. For example, the camera 114 and/or the camera 116 may be operated for capturing a first image that includes one or more passengers seated in the rear seat of the vehicle 105.

The second field of view of objects located outside the vehicle 105 may encompass, for example, one or more individuals standing outside the vehicle 105, man-made objects (buildings, statues, structures, etc.), natural objects (trees, mountains, waterfalls, rivers, animals, birds, etc.), and scenery (sunset, sunrise, etc.). In some cases, the second field of view may further include a portion of the vehicle 105 (such as, for example, roof, trunk, hood, etc.).

In an example implementation in accordance with the disclosure, the image generation system 125 generates a composite image based on integrating the first image and the second image. In an example implementation in accordance with the disclosure, the image generation system 125 propagates the first image and the second image to a computer located outside the vehicle 105. The computer (not shown) generates a composite image based on integrating the first image and the second image. Further details pertaining to the composite image are provided below.

Figure 2:
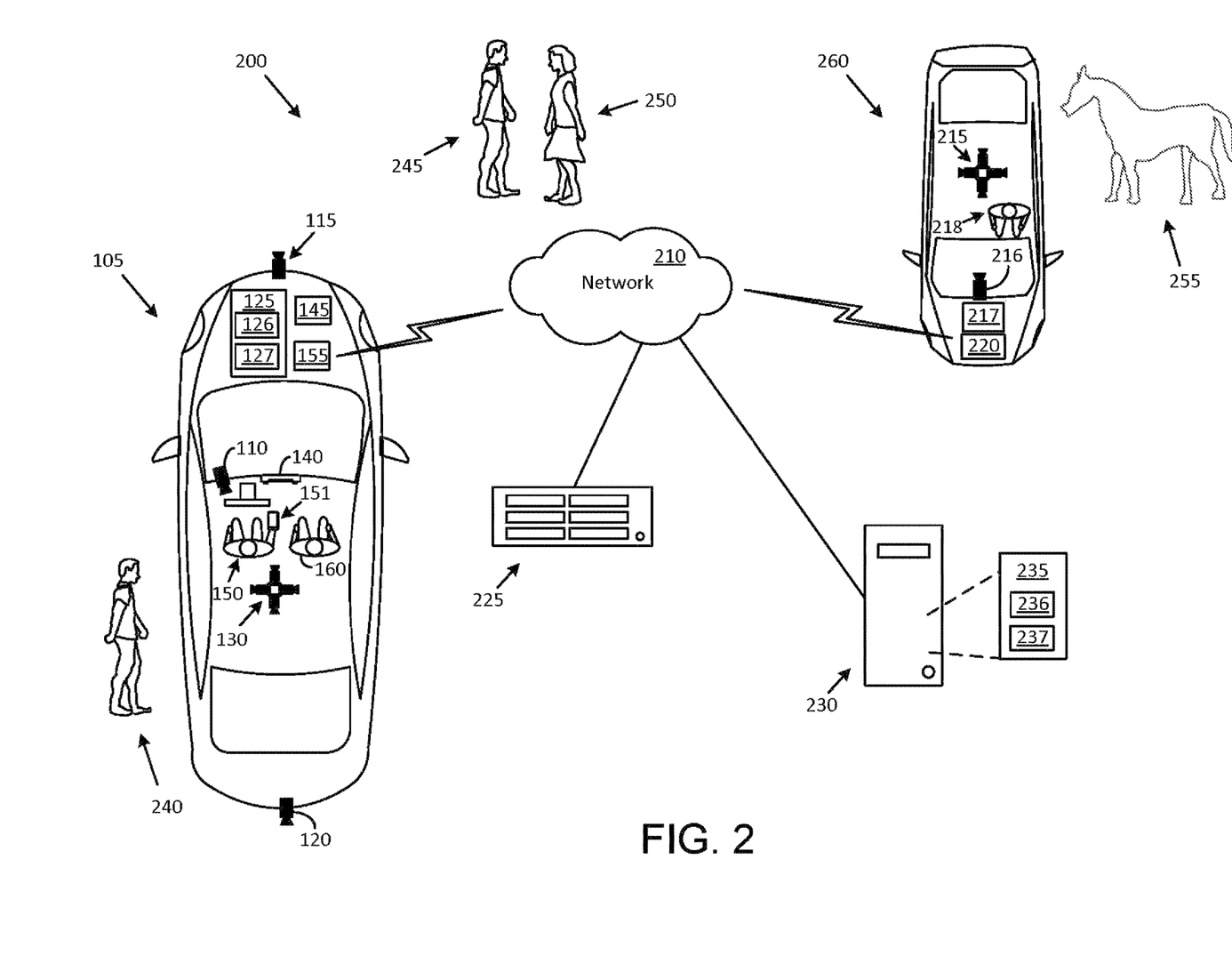
FIG. 2 shows an example system that includes the image generation system provided in the vehicle shown in FIG. 1.

FIG. 2 shows an example system 200 that includes the image generation system 125 provided in the vehicle 105. In this example scenario, the communications system 155 of the vehicle 105 is configured to wirelessly communicate with various devices such as, for example, a computer 230, a cloud storage device 225, and a communications system of another vehicle (such as, for example, a communications system 220 of a vehicle 260).

The wireless communications may be carried out via a network 210, which may include any one, or a combination of networks, such as, for example, a local area network (LAN), a wide area network (WAN), a telephone network, a cellular network, a cable network, a wireless network, and/or private/public networks such as the Internet. At least one portion of the network 210 includes a wireless communication link (a WiFi link, a vehicle-to-everything (V2X) link, a vehicle-to-vehicle (V2V) link, etc.), that allows the communications system 155 of the vehicle 105 to communicate with the communications system 220 of the vehicle 260. The network 210 may also support a wireless communication link (a cellular link, for example) that supports communications between the personal device 151 carried by the driver 150 and devices such as, for example, the communications system 155 of the vehicle 105, the communications system 220 of the vehicle 260, the computer 230, and the cloud storage device 225.

The computer 230 can be any of various types of computers such as, for example, a server computer, a client device, a personal computer, a cloud computer, and/or a distributed computer (multiple computers operating in cooperation with each other as a single computing entity). In the illustrated scenario, the computer 230 includes a processor 236 that is configured to execute computer-executable instructions stored in a memory 237 for performing various operations in accordance with the disclosure. It must be understood that various operations described herein with respect to the image generation system 125 provided in the vehicle 105, particularly with reference to generating a composite image, can be executed by the computer 230 in accordance with the disclosure.

The cloud storage device 225 may be configured to store images generated in accordance with the disclosure, and various types of content (in various formats) that may be used for generating images in accordance with the disclosure. The various types of content can include, for example, computer-generated graphics (icons, graphics, avatars, etc.) that can be included in a composite image generated in accordance with the disclosure. The computer-generated graphics stored in the cloud storage device 225, may be generated by any one or more of various processors in any of one or more computers including, for example, the processor 236 of the computer 235, the processor 126 of the image generation system 125, and a processor (not shown) of the image generation system 217.

The vehicle 260 can be any of various types of vehicles (car, sedan, van, truck, etc.) and can incorporate any of the six levels of driving automation ranging from Level 0 (fully manual) to Level 5 (fully autonomous) defined by the Society of Automotive Engineers (SAE). In addition to the communications system 220, the vehicle 260 can be equipped with one or more cameras. In the illustrated scenario, the vehicle 260 is equipped with a camera 215 that can be, for example, a digital camera configured to capture digital images, a video camera configured to capture video clips, or a video camera configured to capture real-time video. The camera 215 is mounted on the roof the vehicle 260 and provides a 360-degree field of view for capturing images of any object that is located anywhere around the outside of the vehicle 260. Additional cameras such as, for example, a camera 216, may be provided in the cabin area of the vehicle 260 for capturing images of various objects located in the cabin area (a person, an item worn/carried by a person, a pet, a piece of luggage, a vehicle component, etc.).

The vehicle 260 can further include an image generation system 217 that may be substantially similar to the image generation system 125 provided in the vehicle 105. The image generation system 217 of the vehicle 260 can be configured to cooperate with the image generation system 125 of the vehicle 105 (via the communication system 220 and the communication system 155) for executing various imaging operations in accordance with the disclosure.

The vehicle 260 and the vehicle 105 can be used by one or more individuals for any of various purposes. In the example scenario illustrated in FIG. 2, the vehicle 105 is a limo (or a party bus) that is used for transporting individuals who can be members of a group of individuals attending an event (a party, a prom, a wedding, a meeting, etc.). The driver 150 and the passenger 160, who may be members of the group, are seated inside the vehicle 105.

In an alternative scenario, the vehicle 105 can be an autonomous vehicle and the driver 150 can be an occupant of the vehicle 105 and has no driving responsibilities. A first individual 240, who is also a member of the group, is shown approaching a passenger door on the driver side of the vehicle 105. A second individual 245 is shown conversing with a third individual 250 outside the vehicle 105. The second individual 245 and the third individual 250 may be people who are associated with members of the group (friends, parents, etc.) or may be unknown pedestrians.

A fourth individual 218 who is also a member of the group, is shown seated inside the vehicle 260. The fourth individual 218 may have opted to use the vehicle 260 for various reasons such as, for example, because of a lack of seating in the vehicle 105, or because he/she is traveling to the event from a starting location that is different than that of the vehicle 105. The starting location of the vehicle 260 may or may not be in view of the starting location of the vehicle 105. Accordingly, in some cases, the fourth individual 218 may be unable to see the vehicle 105 and may opt to communicate with the occupants of the vehicle 105 (via use of a smartphone, for example) for coordinating some actions.

In an example scenario in accordance with the disclosure, an occupant of the vehicle 105 may desire to capture a group photograph that not only includes the occupants of the vehicle 105 but also some people who are located outside the vehicle 105. In the illustrated example, the people located outside the vehicle 105 include the first individual 240, the second individual 245, the third individual 250, and the fourth individual 218 (in the vehicle 260).

Accordingly, in a first example operation in accordance with the disclosure, the driver 150, for example, may initiate an image capture operation by interacting with the image generation system 125 via the GUI of the infotainment system 140 (or via the personal device 151). Initiating the image generation system 125 may involve providing to the image generation system 125, a first set of details about a desired image.

In one example procedure, the driver 150 may inform the image generation system 125 that he/she desires to include in the desired image, the occupants of the vehicle 105 and other people located outside the vehicle 105 and in view of the vehicle 105. The driver 150 may also inform the image generation system 125 that he/she desires to include in the desired image, some animate and/or inanimate objects located inside and/or outside the vehicle 105 (pets, buildings, animals, etc.).

The image generation system 125 may respond to the input provided by the driver 150, by capturing one or more preview images, and may determine, based on evaluating the preview images, that the desired image can be captured by use of the camera 110 and the camera 130. More particularly, the image generation system 125 may determine, based on evaluating the preview images, that the camera 110 is suitable for capturing images of the occupants of the vehicle 105 (and of animate objects, such as pets, for example, if present in the cabin area). The image generation system 125 may further determine that the camera 130 is suitable for capturing an image of the first individual 240, the second individual 245, and the third individual 250.

The camera 120 may be omitted because no individuals are located behind the vehicle 105. The camera 115 may also be omitted as a result of redundancy with respect to the camera 130 because the image content provided by the camera 130 includes the image content that can be provided by the camera 115 in this scenario. In some cases, a single camera may be selected for capturing multiple images having various fields of view of objects inside and/or outside the vehicle 105.

The processor 126 of the image generation system 125 may then proceed with an image capture operation by operating the camera 110 to capture, for example, a first image based on a first field of view of objects located in the cabin area of the vehicle 105 and by operating the camera 130 to capture a second image based on a second field of view of objects located outside the vehicle 105. The processor 126 may then generate a composite image based on the first image and the second image. The composite image may be displayed upon the display screen of the infotainment system 140 and/or on the personal device 151 for review and approval by the driver 150.

In a second example implementation, the first image and the second image are wirelessly conveyed to the computer 230 via the communication system 155 and the network 210. The processor 236 of the computer 235 generates the composite image and conveys the composite image to the image generation system 125 for display upon the display screen of the infotainment system 140 and/or on the personal device 151.

The composite image generated by the processor 126 of the image generation system 125 and/or by the processor 236 of the computer 235, can be generated by use of various generation procedures. In one example image generation procedure, the first image is superimposed upon the second image (or vice-versa). The superimposition may, for example, involve placing the first image in a foreground layer of the composite image and the second image in a background layer of the composite image. Various image characteristics of at least some portions of the second image that is placed in the background layer of the composite image can be tailored so as to avoid detracting from emphasis on the first image in the foreground layer. For example, image characteristics such as image brightness, contrast, tone, shading, and/or sharpness of at least certain portions of the second image can be tailored to avoid detracting from emphasis on the first image in the foreground layer.

The emphasis on the first image may be directed at providing clarity and focus upon the driver 150, the passenger 160, and some objects in the cabin area of the vehicle 105 (such as, for example, balloons, ribbons, and party paraphernalia). Objects of low interest (or no interest) to the driver 150 may be blurred out, shaded, de-colorized, and/or reduced in brightness, for example. Thus, the background portion of the composite image provides context to certain objects in the foreground portion. The context in this case, is traveling by use of the vehicle 105 (limo, party bus, etc.) to the event (a party, a prom, a wedding, etc.).

In another example image generation procedure, the composite image may be generated by emphasizing human subjects and deemphasizing other image content. For example, people in the first image (the driver 150 and the passenger 160) and people in the second image (the first individual 240, the second individual 245, and the third individual 250) may be retained in sharp focus and provided prominence in the composite image (bigger size, higher scaling, more vivid colors, etc.) while vehicle components and non-human objects may be rendered less distinct and less prominent. The context in this case, is members of the group of people who are attending the event (a party, a prom, a wedding, a meeting, etc.).

In a second example operation in accordance with the disclosure, the driver 150 may provide a second set of details about a desired image. In this case, the driver 150 may inform the image generation system 125 that he/she desires to include in the desired image, the occupants of the vehicle 105, as well as people located outside the vehicle 105 and people located in the vehicle 260. The desired image may further include animate and inanimate objects located inside the vehicle 260 and inside and outside the vehicle 105 (pets, buildings, animals, etc.).

The image generation system 125 may respond to the input provided by the driver 150 by operating the camera 110 to capture a first image based on a first field of view of objects located in the cabin area of the vehicle 105 and by operating the camera 130 to capture a second image based on a second field of objects located outside the vehicle 105.

The image generation system 125 may then communicate with the image generation system 217 of the vehicle 260 to request from the image generation system 217, an image that includes the fourth individual 218. The image generation system 217 may respond to the request by operating the camera 216 to capture an image based on a field of view of objects located in the cabin area of the vehicle 260. The captured image, which is referred to hereinafter as a third image, includes the fourth individual 218 who is seated in the vehicle 260. The image generation system 217 then conveys the third image to the image generation system 125 of the vehicle 105. In some cases, the image generation system 217 may seek, and obtain, permission of the fourth individual 218 before conveying the third image to the image generation system 125 of the vehicle 105.

The image generation system 125 receives the third image provided by the image generation system 217 and generates a composite image based on the third image and one or more of other images such as, for example, the first image and/or the second image described above. As described above, the first image is based on a first field of view of objects located in the cabin area of the vehicle 105 and the second image is based on a second field of objects located outside the vehicle 105 (the first individual 240, the second individual 245, and the third individual 250). The composite image generated by integrating the third image with the first image and/or the second image captured under control of the image generation system 125 can be formatted in various ways such as described above (superimposition, emphasizing human objects, etc.).

In an alternative implementation, the computer 230 may receive the first image and the second image from the image generation system 125 of the vehicle 105 and the third image from the image generation system 217 of the vehicle 260. The computer 230 may generate a composite image based on the three received images and convey the composite image to the image generation system 125 for display upon the display screen of the infotainment system 140 and/or on the personal device 151. The computer 230 may also convey the composite image to an infotainment system (not shown) in the vehicle 260 and/or to a personal device (not shown) of the fourth individual 218.

In a third example operation in accordance with the disclosure, the driver 150 may provide a third set of details about a desired image. In this case, the driver 150 may inform the image generation system 125 that he/she desires to include in the desired image, the occupants of the vehicle 105, people located outside the vehicle 105, people located inside the vehicle 260, and objects located outside the vehicle 260. The image generation system 125 may respond to the input provided by the driver 150 in the manner described above by operating the camera 110 to capture the first image based on a first field of view of objects located in the cabin area of the vehicle 105 and by operating the camera 130 to capture the second image based on a second field of objects located outside the vehicle 105.

The image generation system 125 may then communicate with the image generation system 217 of the vehicle 260 to request from the image generation system 217, the third image described above, as well as a fourth image having a field of view based on objects located outside the vehicle 260. In the illustrated example, the objects located outside the vehicle 260 can include an animal 255 (a horse, for example) as well as the second individual 245 and the third individual 250. The image generation system 125 receives the third image and the fourth image provided by the image generation system 217 and generates a composite image based on two or more of the first image, the second image, the third image, and the fourth image. In another implementation, the computer 230 generates the composite image based on receiving, and operating upon, the four images.

In a fourth example operation in accordance with the disclosure, the driver 150 may provide a fourth set of details about a desired image. In this case, the driver 150 may inform the image generation system 125 that he/she desires to include in the desired image, the occupants of the vehicle 105, as well as certain types of objects that are not in view of the vehicle 105. The image generation system 125 may respond to the input provided by the driver 150 in the manner described above by operating the camera 110 to capture the first image based on a first field of view of objects located in the cabin area of the vehicle 105. The image generation system 125 may then communicate with the computer 230 and/or the cloud storage device 225 to obtain an image that includes certain objects that are not in view of the vehicle 105.

One type of image obtained from the computer 230 and/or the cloud storage device 225 can be, for example, an image of wild animals in a game reserve, a landmark monument (Taj Mahal, White House, etc.), or a nature landmark (Niagara Falls, for example). Another type of image obtained from the computer 230 and/or the cloud storage device 225 can be, for example, an image containing an imaginary object (a cartoon character or an alien spaceship, for example) or a rendering of an imaginary scene (an artistic rendering of a tropical jungle or deep space, for example).

The image generation system 125 receives the image from the computer 230 and/or from the cloud storage device 225 and generates a composite image by integrating the first image with the image obtained from the computer 230 and/or from the cloud storage device 225. The composite image may be displayed upon the display screen of the infotainment system 140 and/or on the personal device 151.

In an alternative example implementation, the computer 230 may receive the first image from the image generation system 125 and generate a composite image by integrating the first image with the second image (image of wild animals, a landmark monument, nature landmark etc.). The composite image may then be conveyed by the computer 230 to the image generation system 125 for display upon the display screen of the infotainment system 140 and/or on the personal device 151.

In some applications, the image generation system 125 and/or the computer 230 can interact with the cloud storage device 225 for performing various video editing operations such as, for example, providing captions in various languages for videos, and using artificial intelligence to execute operations such as, for example, video upscaling, changing frame speeds, video colorization, and smart focus computing. Video upscaling can include, for example, upconverting 720p video to 1080p video and upscaling 1080p video to 8K video. Changing frame speeds can include the use of artificial intelligence techniques to boost speed and/or to produce slow-motion effects. For example, a video capture procedure executed at 8 fps or 16 fps may be upscaled to a 60 fps video. Slow-motion effects can be obtained at various frame rates (for example, 60 fps, 120 fps, or 240 fps). Video colorization can involve converting a black and white video to a colored video using artificial intelligence to perform best guesswork. Smart focus computing can include smart object selection based on factors such as, for example, available bandwidth.

Figure 3:
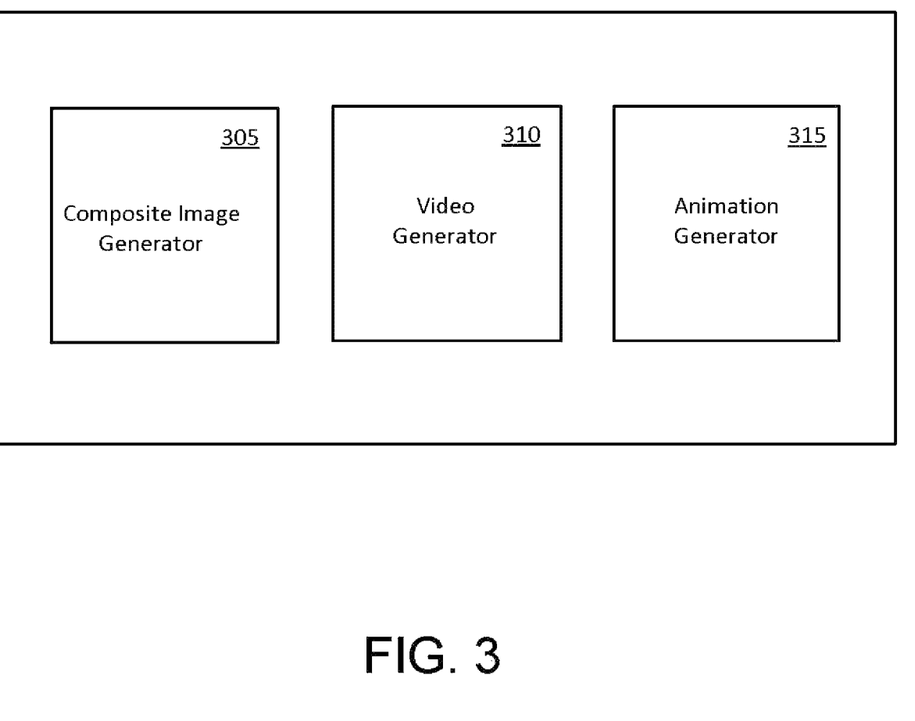
FIG. 3 shows example functional blocks that may be included in an image generation system in accordance with an embodiment of the disclosure.

FIG. 3 shows some example functional blocks that can be implemented in the form of hardware and/or software in the image generation system 125 and/or in the computer 230. Hardware in the image generation system 125, can be provided, for example, in the form of a circuit board containing the processor 126, the memory 127, and components that provide an interface with components provided in the vehicle 105 such as, for example, the vehicle controller 145, the communications system 155, and the various cameras. Software in the image generation system 125, can be provided, for example, in the form of software modules stored in the form of computer-executable instructions in the memory 127 that are executable by the processor 126 for performing various operations in accordance with the disclosure.

Hardware in the computer 230 can be provided, for example, in the form of a circuit board containing the processor 236, the memory 237, and components that provide a communications interface with the image generation system 125 of the vehicle 105 and the image generation system 217 of the vehicle 260. Software in the computer 230, can be provided, for example, in the form of software modules stored in the form of computer-executable instructions in the memory 237 that are executable by the processor 236 for performing various operations in accordance with the disclosure.

The example functional blocks shown in FIG. 3 include a composite image generator 305, a video generator 310, and an animation generator 315. The composite image generator 305 is operative to generate various types of composite images. Generating a first type of composite image involves integrating two or more images captured by one or more cameras provided in one or more vehicles. Some examples pertaining to the first type of composite image are provided above. More particularly, the example described above pertain to a first example composite image that may be generated by integrating a first image based on a first field of view of objects located in a cabin area of the vehicle 105 and a second image based on a second field of view of objects located outside the vehicle 105. A second example composite image may be generated by integrating a first image based on a first field of view of objects located in a cabin area of the vehicle 105, a second image based on a second field of view of objects located outside the vehicle 105, and a third image based on a third field of view of objects located outside the vehicle 260. The second field of view can encompass a 360-degree field of view that may be associated with the camera 130 of the vehicle 105. The third field of view can encompass a 360-degree field of view that may be associated with the camera 215 of the vehicle 260. In an example implementation, a composite image generated by the composite image generator 305 can be a three-dimensional image.

The composite image generator 305 may also be operative to generate a second type of composite image that involves integrating a computer-generated graphic with one or more images captured by one or more cameras provided in one or more vehicles. A few examples of computer-generated graphics include a rendering of an image of wild animals in a game reserve, a rendering of a landmark monument (Taj Mahal, White House, etc.), a rendering of a nature landmark (Niagara Falls, for example), a rendering of an imaginary object (King Kong, Abominable Snowman, Santa Claus, alien warrior, for example), an augmented reality (AR) image, and abstract art.

The video generator 310 is operative to generate various types of video content. In an example implementation, the video generator 310 may generate real-time composite video by combining a video stream obtained from one or more cameras provided in the vehicle 105 with a composite image generated by the composite image generator 305. An example real-time composite video may be generated by the video generator 310 by combining real-time video obtained from the camera 110 with a composite image generated by the composite image generator 305. The composite image can, for example, be based on an augmented reality image generated by the processor 126 of the image generation system 125 or by the processor 236 of the computer 230.

The animation generator 315 is operative to generate still images and/or videos that include animated content (such as, for example, an animated video clip). In an example implementation, the animation generator 315 may generate a composite image by superimposing an image of the driver 150 upon an image that includes an imaginary object (a cartoon character, an alien spaceship, etc.) or an imaginary scene (an artistic rendering of a tropical jungle scene, for example). A set of such composite images may be combined by the animation generator 315 to generate a composite video clip. The video clip may be generated by concatenating a sequence of video frames. Each video frame can include one or more composite images.

In another example implementation, the animation generator 315 may generate a composite video clip by superimposing an image of the driver 150 or an avatar of the driver 150 upon each frame of a sequence of video frames. The avatar can be an artistic rendering such as one provided in a video game.

Figure 4:
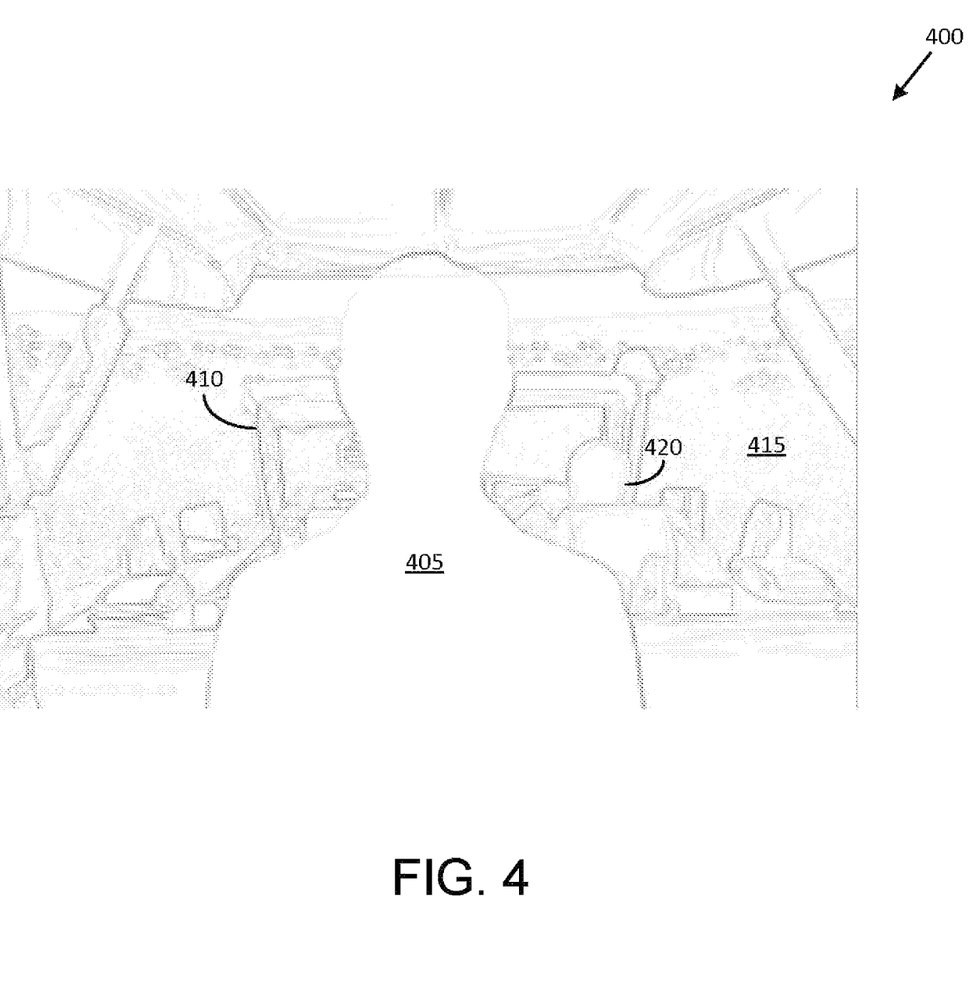
FIG. 4 shows an example image that may be generated by use of an image generation system in accordance with an embodiment of the disclosure.

FIG. 4 shows an example composite image 400 that may be generated by the image generation system 125 and/or by the computer 230 in accordance with an embodiment of the disclosure. In one implementation, the composite image 400 may be generated by superimposing a portion of a first image captured by a first camera, upon a portion of a second image that may be captured by a second camera or may be a computer-generated image. In the illustrated example, the example composite image 400 includes an object 405 that is a silhouette of the driver 150. The silhouette of the driver 150 may be produced by the image generation system 125 (and/or by the computer 230) based on editing a first image captured by a camera, such as, for example, the camera 110. The editing can include operations such as, for example, object selection, outline detection, periphery detection, cropping, scaling, color modification, and sharpening.

In another example, the object 405 can be a modification of an object contained in a first image captured by a camera (the camera 110, for example). The modification, which can be carried out by the image generation system 125 and/or by the computer 230, can involve rendering a portion of the captured image into any of various forms such as, for example, a computer-generated graphic, an outline drawing, or an avatar.

The portion of the second image that is included in the example composite image 400 can be generated by the image generation system 125 (and/or by the computer 230) based on editing a second image captured by a camera such as, for example, the camera 130 of the vehicle 105 or the camera 215 of the vehicle 260. The editing can include operations such as, for example, object selection, cropping, scaling, color modification, brightness modification, contrast modification, tone modification, shading modification, and sharpness modification. Cropping the second image include, for example, deleting a portion of the second image in order to accommodate superimposition of the object 405 upon the second image. In the illustrated example, the portion of the second image that is included in the composite image 400 includes a portion of a vehicle 410 (a front windshield), an individual 420 seated in the vehicle 410, and a scene 415 outside the vehicle 410.

Figure 5:
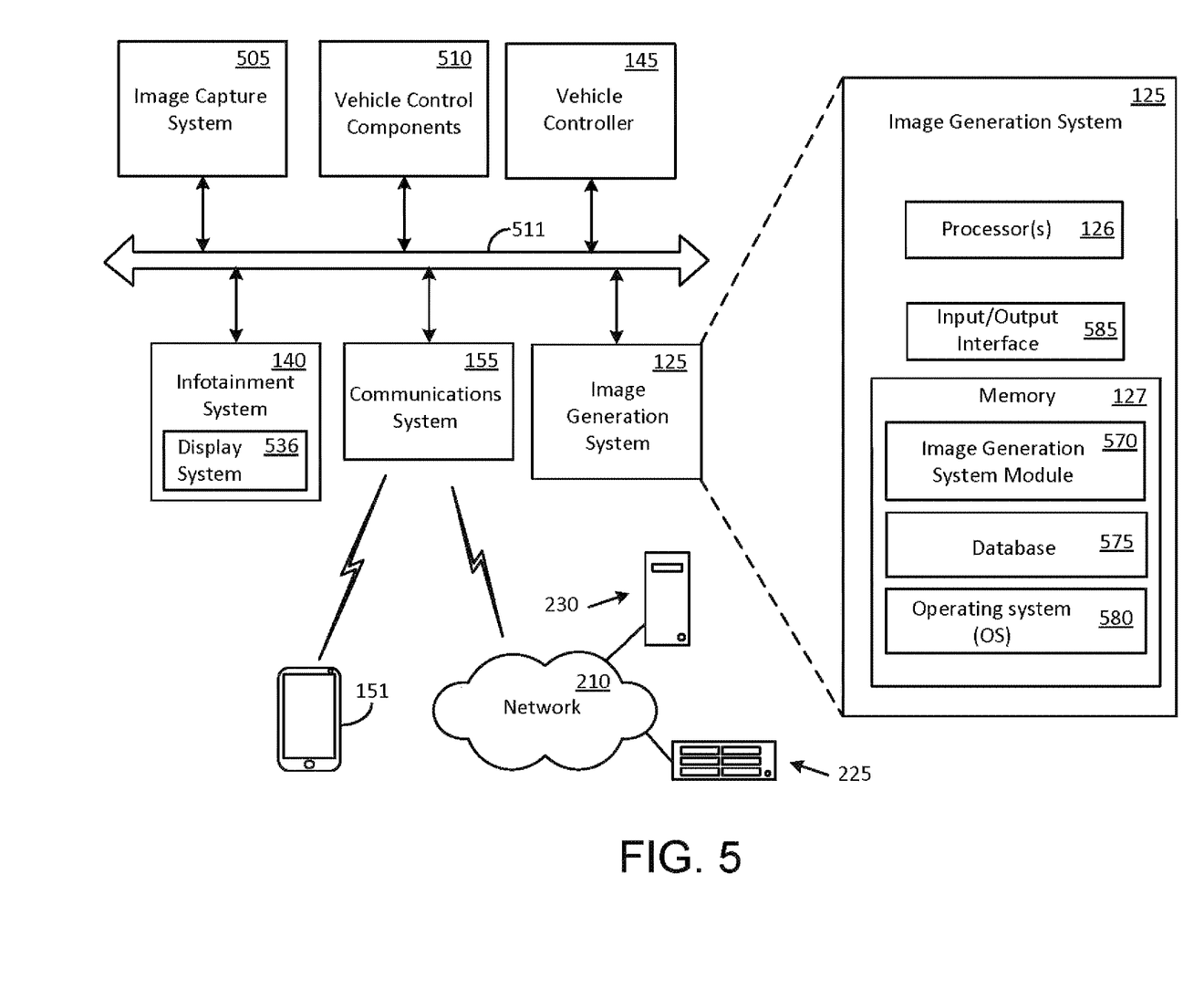
FIG. 5 shows some functional components that may be included in a vehicle that includes an image generation system in accordance with an embodiment of the disclosure.

FIG. 5 shows some functional components that may be included in a vehicle (the vehicle 105, for example) in accordance with an embodiment of the disclosure. The example components can include an image capture system 505, vehicle control components 510, the vehicle controller 145, the infotainment system 140, the communications system 155, and the image generation system 125. The various components are communicatively coupled to each other via one or more buses such as an example bus 511. The bus 511 may be implemented using various wired and/or wireless technologies. For example, the bus 511 can be a vehicle bus that uses a controller area network (CAN) bus protocol, a Media Oriented Systems Transport (MOST) bus protocol, and/or a CAN flexible data (CAN-FD) bus protocol. Some or all portions of the bus 511 may also be implemented using wireless technologies such as Bluetooth®, Ultra-Wideband, Wi-Fi, Zigbee®, or near-field-communications (NFC). In an example implementation, a Matter protocol, which is a unifying, IP-based connectivity protocol may be used. The Matter protocol provides interoperability among various devices including artificial intelligence robots, drones, and Internet-of-Things (IoT) platforms.

The infotainment system 140 can include a display system 536 having a GUI for carrying out various operations. The GUI may be used, for example, by the driver 150 to interact with the image generation system 125 and for performing actions associated with capturing photographs (previewing a photograph, framing a photograph, activating a camera of the image capture system 505, editing a photograph, etc.).

The image capture system 505 can include various types of cameras such as, for example, the camera 110, the camera 115, the camera 120, and the camera 130 that are shown in FIG. 1.

The vehicle control components 510 can include various components and systems associated with driving functions of the vehicle 105 (such as, for example, the engine, brakes, accelerator, and fuel injection) and various other functions such as controlling the cameras provided in the vehicle 105. The vehicle controller 145 can control at least some of the vehicle control components 510 for controlling certain operations of the vehicle 105 when the vehicle 105 is an autonomous vehicle.

The communications system 155 an include various components such as, for example, a wireless transmitter, a wireless receiver, and/or a wireless transceiver, that are configured to allow the image generation system 125 to communicate with devices such as, for example, the image generation system 217, the personal device 151, the computer 230, and the cloud storage device 225. The communications may be carried out via wireless signals either directly or via the network 210 by use of any of various communication formats such as, for example, WiFi, cellular, TCP/IP, Bluetooth®, Ultra-Wideband, Wi-Fi, Ultra-Wideband (UBW), Zigbee®, and near-field-communications (NFC).

In one implementation, the image generation system 125 can be an independent device (enclosed in an enclosure, for example). In another implementation, some or all components of the image generation system 125 can be housed, merged, or can share functionality, with the vehicle controller 145. For example, an integrated unit that combines the functionality of the image generation system 125 with that of the vehicle controller 145 can be operated by a single processor and a single memory device. In the illustrated example configuration, the image generation system 125 includes the processor 126, an input/output interface 585, and the memory 127.

The input/output interface 585 is configured to provide communications between the image generation system 125 and other components such as the image capture system 505 (for receiving images from the cameras, for example).

The memory 127, which is one example of a non-transitory computer-readable medium, may be used to store an operating system (OS) 580, a database 575, and various code modules such as an image generation system module 570. The code modules are provided in the form of computer-executable instructions that can be executed by the processor 126 for performing various operations in accordance with the disclosure.

The database 575 may be used to store information such as, for example, images captured by use of the image capture system 505 and images obtained from the computer 230 and/or cloud storage device 225.

The image generation system module 570 may be executed by the processor 126 for performing various operations in accordance with the disclosure, including, execution of the example functional blocks illustrated in FIG. 3.

Figure 6:
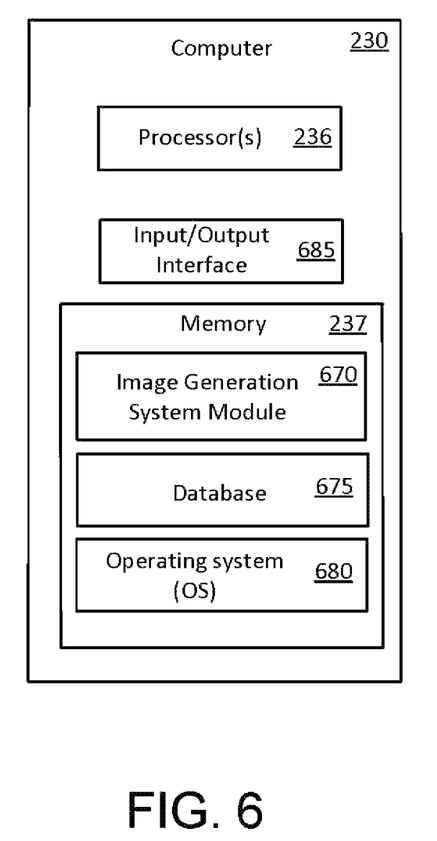
FIG. 6 shows some functional components that may be included in a computer that includes an image generation system in accordance with an embodiment of the disclosure.

FIG. 6 shows some functional components that may be included in the computer 230 in accordance with an embodiment of the disclosure. The example components can include the processor 236, an input/output interface 685, and the memory 237.

The input/output interface 685 is configured to allow interactions between the computer 230 and other components such as the image generation system 125 of the vehicle 105, the image generation system 217 of the vehicle 260, and the cloud storage device 225. More particularly, in an example implementation, the input/output interface 685 is configured to receive images from various devices such as, for example, the image generation system 125, the image generation system 217, and the cloud storage device 225 and to transfer to the image generation system 125, a composite image that is generated by the processor 236 based on the received images.

The memory 237, which is another example of a non-transitory computer-readable medium, may be used to store an operating system (OS) 680, a database 675, and various code modules such as an image generation system module 670. The code modules are provided in the form of computer-executable instructions that can be executed by the processor 236 for performing various operations in accordance with the disclosure.

The database 675 may be used to store information such as, for example, images obtained from the image generation system 125, the image generation system 217, and the cloud storage device 225.

The image generation system module 670 may be executed by the processor 236 for performing various operations in accordance with the disclosure, including, execution of the example functional blocks illustrated in FIG. 3.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. More particularly, it must be understood that various operations described above with respect to the image generation system 125 of the vehicle 105 can be executed by various other devices such as, for example, the computer 230 (and vice-versa). The computer 230 may execute these operations either independently, or in cooperation with the image generation system 125.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 127, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   receiving, by a processor, a first preview image based on a first field of view of objects located in a cabin area of a first vehicle and a second preview image based on a second field of view of objects located outside of the first vehicle;
   evaluating, by the processor, the first preview image and the second preview image for suitability for generating a desired image;
   receiving, by the processor, a first image based on the first field of view of objects located in the cabin area of the first vehicle and a second image based on the second field of view of objects located outside the first vehicle;
   receiving, by the processor, a third image based on a third field of view of objects located outside of a second vehicle; and
   generating, by the processor, a first composite image based on the first image, the second image, and the third image.

2. The method of claim 1, wherein the objects located in the cabin area of the first vehicle include a first individual and/or a first animal, wherein the objects located outside the first vehicle and/or outside the second vehicle include a second individual and/or a second animal, and wherein the first composite image includes the first individual and/or the first animal and further includes the second individual and/or the second animal.

3. The method of claim 1, wherein the first composite image is generated by superimposing at least a portion of the first image upon at least a portion of the second image and/or upon at least a portion of the third image.

4. The method of claim 1, further comprising:
   generating, by the processor, a second composite image by superimposing a computer-generated graphic upon at least a portion of the first image, at least a portion of the second image, and/or at least a portion of the third image.

5. The method of claim 4, wherein the first image includes an individual who is seated in the cabin area of the first vehicle, and wherein the method further comprises:
   generating, by the processor, an animated video clip based on integrating the second composite image with at least a fourth composite image comprising the individual and the computer-generated graphic.

6. The method of claim 1, wherein the first image includes an individual who is seated in the cabin area of the first vehicle, and wherein the method further comprises:
   generating, by the processor, an avatar of the individual; and
   generating, by the processor, a second composite image based on integrating the avatar with at least a portion of the first image, at least a portion of the second image, and/or at least a portion of the third image.

7. The method of claim 6, further comprising:
   generating, by the processor, an animated video clip based on integrating the second composite image with at least a fourth composite image comprising the avatar.

8. A method comprising:
   receiving, by a processor, from a first vehicle, a first preview image based on a first field of view of objects located in a cabin area of the first vehicle and a second preview image based on a second field of view of objects located outside of the first vehicle;
   evaluating, by the processor, the first preview image and the second preview image for suitability for generating a desired image;
   receiving, by the processor, from the first vehicle, a first image based on a the first field of view of objects located in the cabin area of the first vehicle and a second image based on the second field of view of objects located outside the first vehicle; and
   generating, by the processor, a first composite image based on the first image and the second image.

9. The method of claim 8, further comprising:
   receiving, by the processor, from a second vehicle, a third image based on a third field of view of objects located outside the second vehicle; and
   generating, by the processor, a second composite image based on the third image and at least one of the first image or the second image.

10. The method of claim 9, wherein at least one of the second field of view or the third field of view is a 360-degree field of view.

11. The method of claim 8, further comprising:
    generating, by the processor, a second composite image by superimposing a third image upon at least a portion of the first image and/or upon at least a portion of the second image.

12. The method of claim 11, wherein the third image is one of provided by a second vehicle, obtained from a memory device, or generated by the processor.

13. The method of claim 8, wherein the objects located in the cabin area of the first vehicle include a first individual, and wherein the method further comprises:
    generating, by the processor, an avatar of the first individual; and
    generating, by the processor, a second composite image by superimposing the avatar upon at least a portion of the first image and/or upon at least a portion of the second image.

14. The method of claim 13, wherein the second composite image is a three-dimensional image.

15. A system comprising:
    a first vehicle comprising:
        an image capture system configured to capture first images based on a first field of view of objects located in a cabin area of the first vehicle and second images based on a second field of view of objects located outside the first vehicle;
        an infotainment system comprising a first display screen; and a first image generation system comprising:
- a first memory containing computer-executable instructions; and
- a first processor configured to access the first memory and execute the computer-executable instructions to perform operations comprising:
  - receiving a first preview image based on the first field of view of objects located in the cabin area of the first vehicle and a second preview image based on the second field of view of objects located outside of the first vehicle;
  - evaluating the first preview image and the second preview image for suitability for generating a desired image;
  - receiving a first image based on the first field of view of objects located in the cabin area of the first vehicle and a second image based on the second field of view of objects located outside of the first vehicle;
  - generating a first composite image based on the first image and the second image; and
  - displaying the first composite image upon the first display screen of the infotainment system.

16. The system of claim 15, wherein the first processor is further configured to access the first memory and execute the computer-executable instructions to perform additional operations comprising:
- generating an avatar of an individual seated in the cabin area of the first vehicle; and
- generating a second composite image by superimposing the avatar upon at least a portion of the first image and/or at least a portion of the second image.

17. The system of claim 15, wherein the first vehicle further comprises a communications system configured to convey the first composite image to a personal device, and wherein the first processor is further configured to access the first memory and execute the computer-executable instructions to perform additional operations comprising:
displaying the first composite image upon a second display screen of the personal device.

18. The system of claim 15, further comprising:
a second vehicle; and
a computer comprising:
- a second image generation system comprising:
  - a second memory containing computer-executable instructions; and
  - a second processor configured to access the second memory and execute the computer-executable instructions to perform operations comprising:
    - receiving, from the first vehicle, the first image and the second image;
    - receiving, from the second vehicle, a third image based on a third field of view of objects located outside the second vehicle; and
    - generating a second composite image based on the first image, the second image, and the third image.

19. The system of claim 18, wherein the second processor of the second image generation system is further configured to access the second memory and execute computer-executable instructions to perform additional operations comprising:
- generating a graphic; and
- generating a third composite image by superimposing the graphic upon at least a portion of the first image, at least a portion of the second image, and/or at least a portion of the third image.

20. The system of claim 19, wherein the second processor of the second image generation system is further configured to access the second memory and execute computer-executable instructions to perform additional operations comprising:
- generating an animated video clip based on integrating the third composite image with at least a fourth composite image comprising the graphic.

* * * * *